United States Patent
Rabasco et al.

(10) Patent No.: US 12,331,193 B2
(45) Date of Patent: Jun. 17, 2025

(54) HYDROPHOBICALLY MODIFIED ALKYLENE OXIDE POLYMER MIXTURE

(71) Applicant: Rohm and Haas Company, Collegeville, PA (US)

(72) Inventors: John J. Rabasco, Allentown, PA (US); Daniel A. Saucy, Harleysville, PA (US)

(73) Assignee: Rohm and Haas Company, Collegeville, PA (US)

( * ) Notice: Subject to any disclaimer, the term of this patent is extended or adjusted under 35 U.S.C. 154(b) by 530 days.

(21) Appl. No.: 17/765,083

(22) PCT Filed: Oct. 29, 2020

(86) PCT No.: PCT/US2020/057881
§ 371 (c)(1),
(2) Date: Mar. 30, 2022

(87) PCT Pub. No.: WO2021/096689
PCT Pub. Date: May 20, 2021

(65) Prior Publication Data
US 2022/0356351 A1 Nov. 10, 2022

Related U.S. Application Data

(60) Provisional application No. 62/934,786, filed on Nov. 13, 2019.

(51) Int. Cl.
| | |
|---|---|
| *C08L 75/08* | (2006.01) |
| *C08G 18/28* | (2006.01) |
| *C08G 18/48* | (2006.01) |
| *C08G 18/75* | (2006.01) |
| *C08G 65/26* | (2006.01) |
| *C08G 65/331* | (2006.01) |
| *C08G 65/333* | (2006.01) |
| *C08L 71/02* | (2006.01) |
| *C08L 75/04* | (2006.01) |
| *C09D 5/04* | (2006.01) |
| *C09D 7/44* | (2018.01) |
| *C09D 7/65* | (2018.01) |

(52) U.S. Cl.
CPC ............ *C08L 75/08* (2013.01); *C08G 18/283* (2013.01); *C08G 18/2875* (2013.01); *C08G 18/4833* (2013.01); *C08G 18/758* (2013.01); *C08G 65/2609* (2013.01); *C08G 65/3312* (2013.01); *C08G 65/33348* (2013.01); *C09D 5/04* (2013.01); *C09D 7/44* (2018.01); *C09D 7/65* (2018.01)

(58) Field of Classification Search
None
See application file for complete search history.

(56) References Cited

U.S. PATENT DOCUMENTS

| | | | |
|---|---|---|---|
| 3,047,523 A | 7/1962 | Sullivan et al. | |
| 7,432,325 B2 | 10/2008 | Blankenship et al. | |
| 7,741,402 B2 | 6/2010 | Bobsein et al. | |
| 2006/0106153 A1* | 5/2006 | Blankenship | C08G 18/792 |
| | | | 524/500 |
| 2008/0234411 A1* | 9/2008 | Bobsein | C08G 18/0814 |
| | | | 524/48 |

FOREIGN PATENT DOCUMENTS

EP 1972665 A2 9/2008

* cited by examiner

*Primary Examiner* — Ha S Nguyen
(74) *Attorney, Agent, or Firm* — Reid S. Willis

(57) ABSTRACT

The present invention relates to a composition comprising a mixture of a first and a second hydrophobically modified alkylene oxide polymer, wherein the first hydrophobically modified alkylene oxide polymer is endcapped with at least one first hydrophobic group functionalized with a secondary amine or a salt thereof, or a tertiary amine or a salt thereof; and wherein the second hydrophobically modified alkylene oxide polymer is endcapped with at least one second hydrophobic group, structure I:

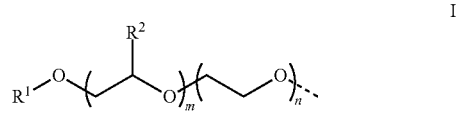

where $R^1$, $R^2$, m, and n are as defined herein. The present invention also relates to a method for preparing the composition. The composition of the present invention provides an associative thickener with an excellent balance of as-is viscosity and temperature stability over a wide temperature range.

17 Claims, No Drawings

HYDROPHOBICALLY MODIFIED ALKYLENE OXIDE POLYMER MIXTURE

BACKGROUND OF THE INVENTION

The present invention relates to a composition comprising a mixture of hydrophobically modified alkylene oxide polymers, more particularly, a mixture of hydrophobically modified ethylene oxide polymers (HEURs) end-capped with different hydrophobic groups.

HEURs are a class of associative thickeners that are used to control the viscosity of waterborne coatings formulations. HEURs that are end-capped with alkyl or aromatic groups are known to be effective thickeners; yet, such materials suffer from two disadvantages: First, aqueous solutions of such HEURs often require a co-solvent or cyclodextrin to suppress the as-is viscosity, that is, the Brookfield viscosity of an aqueous solution containing from about 15 to 30 weight percent HEUR, to less than 10,000 cps; such low viscosities are desirable to make the HEURs easier to handle and to pump into paint formulations. Second, paints thickened with these HEURs are known to exhibit an unacceptably large decrease in viscosity ($\Delta KU > 25$ Krebs units) with increased temperature. Accordingly, there is a need in the art for a rheology modifier that shows acceptable as-is viscosity without co-solvent or other additive with concomitant viscosity stability over a temperature range to which paints and other coating formulations are typically exposed.

SUMMARY OF THE INVENTION

The present invention addresses a need in the art by providing a composition comprising a mixture of a first and a second hydrophobically modified alkylene oxide polymer, wherein the first hydrophobically modified alkylene oxide polymer is endcapped with at least one first hydrophobic group functionalized with a secondary amine or a salt thereof, or a tertiary amine or a salt thereof; and wherein the second hydrophobically modified alkylene oxide polymer is endcapped with at least one second hydrophobic group, structure I:

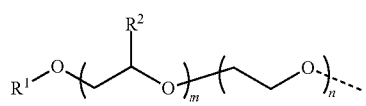

wherein the dotted line represents the point of attachment of the hydrophobic group of structure I to the alkylene oxide polymer backbone; where $R^1$ is from $C_1$-$C_{10}$-alkyl; $R^2$ is from $C_1$-$C_6$-alkyl; m is from 5 to 40; and n is from 0 to 50, with the proviso that when m is from 5 to 9, n is from 0 to 10. The composition of the present invention provides an associative thickener with an excellent balance of as-is viscosity and temperature stability over a wide temperature range.

DETAILED DESCRIPTION OF THE INVENTION

The present invention is a composition comprising a mixture of a first and a second hydrophobically modified alkylene oxide polymer, wherein the first hydrophobically modified alkylene oxide polymer is endcapped with at least one first hydrophobic group functionalized with a secondary amine or a salt thereof, or a tertiary amine or a salt thereof; and wherein the second hydrophobically modified alkylene oxide polymer is endcapped with at least one second hydrophobic group, structure I:

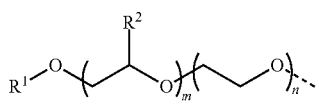

wherein the dotted line represents the point of attachment of the hydrophobic group of structure I to the alkylene oxide polymer backbone; where $R^1$ is from $C_1$-$C_{10}$-alkyl; $R^2$ is from $C_1$-$C_6$-alkyl; m is from 5 to 40; and n is from 0 to 50, with the proviso that when m is from 5 to 9, n is from 0 to 10.

Preferably, $R^1$ is $C_1$-$C_8$ alkyl, and more preferably $C_2$-$C_6$-alkyl; $R^2$ preferably methyl or ethyl; and more preferably methyl; m is preferably from 10, and more preferably from 12, to preferably 30, and more preferably to 20; and n is preferably from 0 to 20, more preferably 0.

As used herein, the term "alkylene oxide polymer" refers to water-soluble polyethylene oxide polymers, as well as water-soluble polyethylene oxide/polypropylene oxide and polyethylene oxide/polybutylene oxide copolymers. Preferably, the alkylene oxide polymer is an alkylene oxide urethane polymer, more preferably an ethylene oxide urethane polymer.

A water-soluble polyalkylene glycol refers to water-soluble polyethylene oxides, water-soluble polyethylene oxide/polypropylene oxide copolymers, and water-soluble polyethylene oxide/polybutylene oxide copolymers. Preferred water-soluble polyalkylene oxides are polyethylene glycols, particularly polyethylene glycols having a weight average molecular weight in the range of from 4000, more preferably from 6000, and most preferably from 7000 to 20,000, more preferably to 12,000 and most preferably to 9000 Daltons. An example of a suitable polyethylene glycol is PEG 8000, which is commercially available as CARBOWAX™ 8000 Polyethylene Glycol (a trademark of The Dow Chemical Company ("Dow") or an affiliate of Dow, Midland, MI).

Examples of diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, and m- and p-phenylene diisocyanates.

As used herein, the term "first hydrophobic group" refers to a first hydrophobic compound except for the hydrogen atom or atoms associated with group or groups that react with the isocyanate portion of the preferred alkylene oxide polymer backbone. For example, if the first hydrophobic compound used to form the first hydrophobic group is 2-(dibutylamino) ethanol, the first hydrophobic group is characterized by the following formula:

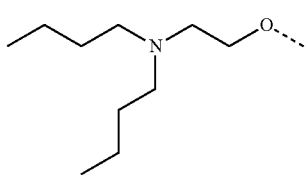

where the dotted line represents the point of attachment to the alkylene oxide polymer backbone. If the hydrophobic compound used to form the first hydrophobic group is 2-(dibutylamino) ethylamine, for example, the first hydrophobic group is characterized by the following formula:

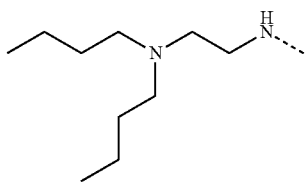

In the first example, the first hydrophobic compound reacts with, for example, an isocyanate group to form a carbamate; in the second instance, the first hydrophobic compound reacts with an isocyanate group to form a urea.

The first hydrophobic group in the free base form preferably has a calculated Log P (cLog P) in the range of from 2, more preferably from 4, to 12, more preferably to 10, and most preferably to 8. The cLog P is determined using ChemBioDraw Ultra 13.0 (PerkinElmer), which uses a chemical fragment algorithm method for assessing the partition coefficient of a molecule based on its constituent parts.

Examples of compounds that can be used to generate the first hydrophobic group include 2-(t-butylamino)ethanol; 2-(dibutylamino)ethanol; 2-(dioctylamino)ethanol; 2-(diheptylamino)ethanol; 2-(bis(2-ethylhexyl)amino)ethanol (BE-HAE, cLog P=6.75)); 2-(dihexylamino)ethanol; 3-(dibutylamino)propanol; 2-(dibutylamino)ethylamine; 3-(dibutylamino)propylamine; N-benzyl-N-methylethanolamine; 1-(dibutylamine)-2-butanol; 4-amino-1-benzyl-piperidine; 1-(benzyl(2-hydroxyethyl)amino)-3-alkoxypropan-2-ols such as 1-(benzyl(2-hydroxyethyl)amino)-3-butoxypropan-2-ol and 1-(benzyl(2-hydroxyethyl)amino)-3-(2-ethylhexyl)oxypropan-2-ol; 1-[bis(phenylmethyl)amino]-3-[(2-alkoxy]-2-propanols such as 1-[bis(phenylmethyl)amino]-3-[(2-butyl)oxyl]-2-propanol and 1-[bis(phenylmethyl)amino]-3-[(2-ethylhexyl)oxyl]-2-propanol; and dibenzylaminopolyalkylene oxides of the type:

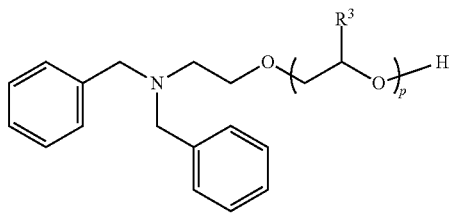

where R³ is methyl or ethyl and p is from 1 to 10. The first hydrophobic group is referred to as a remnant of a compound used to generate the first hydrophobic group.

Though not bound by theory, it is believed that structure I hydrophobes comprising at least 5 propylene oxide groups (that is, where m≥5) tend to collapse (curl up) and associate at an intramolecular level at low temperatures, but extend (straighten out) at higher temperatures. This conformational transition is evidence of increased hydrophobicity of the pendant groups. As temperature increases, the groups become more hydrophobic and are therefore more susceptible to intermolecular association with the binder, thereby improving temperature stability.

The preferred hydrophobically modified alkylene oxide urethane polymer is conveniently prepared by contacting under suitable reactive conditions, a) a water-soluble polyalkylene glycol; b) a stoichiometric excess of a diisocyanate relative to the polyalkylene glycol; and a mixture of c1) a first hydrophobic compound functionalized with a secondary or a tertiary amine or a quaternary ammonium salt; and c2) a second hydrophobic compound of structure Ia, to form the hydrophobically modified alkylene oxide urethane polymer, wherein the hydrophobic compound of structure Ia is as follows:

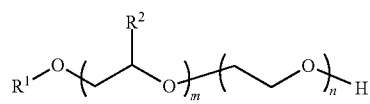

Hydrophobic compounds of structure Ia can be conveniently prepared in accordance the following reaction scheme:

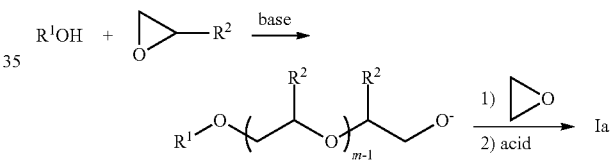

The hydrophobic compound of structure I is a remnant of the hydrophobic compound of structure Ia. A commercial example of a compound of Structure Ia is UCON™ LB-285 Polyalkylene Glycol (LB-285, a Trademark of The Dow Chemical Company or its Affiliates), an oligomeric polypropylene oxide monoalcohol.

Component b) may also be dichloromethane, dibromomethane, epichlorohydrin, or an aminoplast instead of a diisocyanate. The relative amounts of c1) and c2) can be adjusted to tune the properties of the composition. When this preferred method is used, the composition comprises a mixture of alkylene oxide polymers, preferably ethylene oxide urethane polymers, one endcapped with two first hydrophobic groups, one endcapped with two second hydrophobic groups, and one endcapped with a first hydrophobic group and a second hydrophobic group. Thus, in another aspect of the present invention, the composition comprises a first hydrophobically modified alkylene oxide polymer endcapped with two first hydrophobic groups; a second hydrophobically modified alkylene oxide polymer endcapped with two second hydrophobic groups of structure I, wherein the composition further comprises a hydrophobically modified alkylene oxide polymer endcapped with both first and second hydrophobic groups.

Preferably, the mole:mole ratio of the HEUR capped with a first hydrophobic group and a second hydrophobic group to the total of HEURs capped with first hydrophobic groups only and second hydrophobic groups only is in the range of from 1:3 to 1:1; preferably, the mole:mole ratio of first hydrophobic groups to second hydrophobic groups is in the range of from 15:85, more preferably from 25:75 to preferably 60:40, more preferably to 50:50.

Alternatively, the preferred composition can be prepared by pre-reacting a molar excess of the diisocyanate with the polyalkylene glycol to make an alkylene oxide-urethane polymeric backbone with remnant isocyanate groups, followed reaction with the first and second hydrophobic compounds in any order or simultaneously.

In another but less preferred method of preparing the composition of the present invention, components a), b) and c1) are contacted under reactive conditions to form a first hydrophobically modified alkylene oxide urethane polymer endcapped with the first hydrophobic groups. In a separate reaction, components a), b) and c2) are contacted under reactive conditions to form a second hydrophobically modified alkylene oxide urethane polymer endcapped with the second hydrophobic groups. Then, the first and second hydrophobically modified alkylene oxide urethane oxide polymers are combined at predetermined ratios.

The composition of the present invention is preferably admixed with water to form an aqueous solution. The composition is useful in coating formulations, especially pigmented paint formulations, and may further comprise other components including binders, pigments, surfactants, coalescents, defoamers, opaque polymers, and extenders.

EXAMPLES

All HEUR solid samples were dissolved in water at 20% active HEUR solids along with 2% gluconic acid. In the following examples, the HEURs functionalized solely with LB-285 or BEHAE capping agents are intermediates for the blend examples and comparative examples for the HEURs co-capped with both capping agents. c1 Intermediate Example 1 (Comparative Example 1)—Preparation of a HEUR Capped with LB-285 Only CARBOWAX™ 8000 Polyethylene Glycol (A Trademark of The Dow Chemical Company or its Affiliates, PEG 8000, 1500 g) was heated to 110° C. in vacuo in a batch melt reactor for 2 h. The melt was cooled to 100° C., whereupon butylated hydroxytoluene (BHT, 0.188 g) and LB-285 (301.61 g) were added to the reactor. The mixture was stirred for 5 min, and Desmodur W Dicyclohexylmethane-4,4-diisocyanate (Des W, 77.47 g) was then added to the reactor. The reaction mixture was stirred for 5 min, and bismuth octoate (28% Bi, 3.75 g) was then added to the reactor. The mixture was stirred for 10 min at 100° C., after which time the resulting molten polymer was removed from the reactor and cooled.

Intermediate Example 2 (Comparative Example 2)—Preparation of a HEUR Capped with BEHAE Only PEG 8000 (1700 g) was heated to 110° C. in vacuo in a batch melt reactor for 2 h. The melt was cooled to 100° C., whereupon BHT (0.19 g) and BEHAE (103.47 g) were added to the reactor. The mixture was stirred for 5 min, then Des W (94.95 g) was added to the reactor.

The reaction mixture was stirred for 5 min, and bismuth octoate (28% Bi, 4.75 g) was then added to the reactor, and the resulting mixture was stirred for 10 min at 100° C. The mixture was stirred for 10 min at 100° C., after which time the resulting molten polymer was removed from the reactor and cooled.

Example 1—Preparation of a HEUR Co-capped with LB-285 and BEHAE

PEG 800 (1500 g) was heated to 110° C. in vacuo in a batch melt reactor for 2 h. The reaction melt was cooled to 100° C. whereupon BHT (0.179 g), LB-285 (266.86 g) and BEHAE (16.6 g) were added to the reactor. The mole:mole ratio of LB-285:BEHAE was 82:18. The mixture was stirred for 5 min, and Des W (83.78 g) was then added to the reactor. The reaction mixture was stirred for 5 min, and bismuth octoate (28% Bi, 3.75 g) was then added to the reactor, and the resulting mixture was stirred for 10 min at 100° C. The mixture was stirred for 10 min at 100° C., after which time the resulting molten polymer was removed from the reactor and cooled.

Examples 2-4—Preparation of a HEUR Co-capped with Different Levels of LB-285 and BEHAE The co-capped HEURs were prepared essentially as described in Example 1 except that the mole:mole ratios of LB-285:BEHAE were varied. The co-capped HEURs and blends of the singly capped HEURs were evaluated for as-is viscosity and, in separate evaluations, formulated into paints, which were evaluated for viscosity stability. As-is viscosity (cps) was measured using a Brookfield viscometer, spindle #3, 30 rpm. ΔKU is the difference of the KU viscosity of the paint measured at 38° C. and the KU viscosity of the paint measured at 2° C. as measured using a Brookfield KU-1+viscometer or equivalent KU viscometer.

Table 1 illustrates the paint formulation and Table 2 illustrates the properties of co-capped HEURs against HEURs capped only with LB-285 or BEHAE.

TABLE 1

| Paint Formulation | |
|---|---|
| Material | Wt. (lbs) |
| Grind | |
| Water | 29.2 |
| TAMOL ™ 165A Dispersant | 5.4 |
| Propylene Glycol | 2.2 |
| Byk 024 Defoamer | 1.5 |
| Ti-Pure R-746 TiO$_2$ | 230.7 |
| ECOSURF ™ Surfactant | 2.2 |
| Kathon LX 1.5% Biocide | 1.5 |
| Grind Subtotal | 272.7 |
| RHOPLEX ™ 585 Binder | 475.8 |
| ROPAQUE ™ Ultra E Opacifier | 35.9 |
| Texanol Dispersant | 12.2 |
| Byk 024 Defoamer | 1.5 |
| AMP-95 2-amino-2-methyl-1-propanol | 0.7 |
| Example HEUR | 44.4 |
| Rocima 63 Biocide | 10.0 |
| Water | 140.7 |
| Totals | 993.5 |

In the following Table 2, all paints were thickened to KU=100 and ICI=1.2 Poise at 25° C.; HEUR dry lbs refers to total dry lbs of the HEUR/100 gal of paint. Mole % LB-285 is not shown but is calculated as 100-Mole % BEHAE. As-is viscosity is in units of cps. An as-is viscosity of less than 10,000 cps and a AKU between 20 and −20 are acceptable. The solids content of the aqueous solution of the HEURs (HEUR Aq. sol.) was 20 weight percent based on the weight of water and the HEUR. The HEUR solutions also contained 2 weight percent gluconic acid based on the weight of the water, the HEUR, and the gluconic acid.

TABLE 2

Properties of Co-capped HEURs Versus Singly Capped HEURs

| Example | Mole % BEHAE | HEUR Aq. sol. As-is viscosity | Paint Data HEUR dry lbs | Total dry lbs | ΔKU | Overall Acceptability As-Is Visc. | T Stability |
|---|---|---|---|---|---|---|---|
| 1 | 18 | 8638 | 1.83 | 5.61 | −5 | Y | Y |
| 2 | 27 | 5199 | 1.40 | 5.41 | −10 | Y | Y |
| 3 | 36 | 2899 | 1.26 | 5.42 | −12 | Y | Y |
| 4 | 50 | 1700 | 1.02 | 5.47 | −16 | Y | Y |
| Comp 1 | 0 | 17576 | 4.23 | 6.98 | 11 | N | Y |
| Comp 2 | 100 | 1140 | 0.84 | 5.72 | −26 | Y | N |

Example 5—Blend of Singly Capped HEURs

Intermediate Example 1 dry polymer (5.84 g), Intermediate Example 2 dry polymer (2.16 g), water (30.4 g) and gluconic acid (50% aqueous solution, 1.6 g) were mixed at room temperature until dissolved and homogenous. The pH of the resulting solution was 2.77.

The mole:mole ratio of capping agent from Intermediate Example 1 to the capping agent from Intermediate Example 2 was 90:10.

Examples 6-8—Blend of Varying Amounts of Singly Capped HEURs

Blends of singly capped HEURs were prepared as described in Example 5 except that the amounts were varied as illustrated in Table 3.

TABLE 3

Blends of Singly Capped HEURs

| Blend Example | Int. 1 (g) | Int. 2 (g) | Water (g) | 50% Gluconic Acid (g) | pH |
|---|---|---|---|---|---|
| 5 | 5.84 | 2.16 | 30.4 | 1.6 | 2.88 |
| 6 | 5.12 | 2.88 | 30.4 | 1.6 | 2.98 |
| 7 | 4.0 | 4.0 | 30.4 | 1.6 | 3.11 |
| 8 | 2.0 | 6.0 | 30.4 | 1.6 | 3.28 |

The properties of the blended HEURs are illustrated in Table 4.

TABLE 4

Properties of Blends of Singly Capped HEURs

| Example | Mole % BEHAE | HEUR Aq. sol. As-is viscosity | Paint Data HEUR dry lbs | Total dry lbs | ΔKU | Overall Acceptability As-Is Visc. | T Stability |
|---|---|---|---|---|---|---|---|
| 5 | 27 | 8368 | 2.37 | 6.95 | −2.9 | Y | Y |
| 6 | 36 | 5849 | 2.04 | 6.80 | −5.6 | Y | Y |
| 7 | 50 | 3299 | 1.79 | 7.12 | −8.3 | Y | Y |
| 8 | 75 | 1680 | 1.51 | 6.80 | −10.4 | Y | Y |

The data from Table 2 and Table 4 suggest that HEURs with acceptable as-is viscosity and temperature stability can be prepared by either co-capping HEURs with the hydrophobic compounds described herein, or by blending different singly capped HEURs. Nevertheless, co-capped HEURs are more easily prepared and surprisingly give an additional advantage of reduced dry lb loading in optimized combinations.

The invention claimed is:

1. A composition comprising a mixture of a first and a second hydrophobically modified alkylene oxide polymer, wherein the first hydrophobically modified alkylene oxide polymer is endcapped with at least one first hydrophobic group functionalized with a secondary amine or a salt thereof, or a tertiary amine or a salt thereof; and wherein the second hydrophobically modified alkylene oxide polymer is endcapped with at least one second hydrophobic group, structure I:

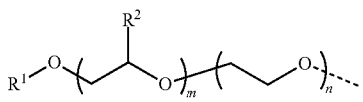

wherein the dotted line represents the point of attachment of the hydrophobic group of structure I to the alkylene oxide polymer backbone; where $R^1$ is from $C_1$-$C_{10}$-alkyl; $R^2$ is from $C_1$-$C_6$-alkyl; m is from 5 to 40; and n is from 0 to 50, with the proviso that when m is from 5 to 9, n is from 0 to 10, wherein the first and second hydrophobically modified alkylene oxide polymers are hydrophobically modified ethylene oxide urethane polymers, and wherein the mole:mole ratio of first hydrophobic groups to second hydrophobic groups is in the range of from 15:85 to 75:25.

2. The composition of claim 1 wherein $R^1$ is $C_1$-$C_8$ alkyl; $R^2$ is methyl or ethyl; m is from 10 to 30; and n is from 0 to 20.

3. The composition of claim 2 wherein $R^1$ is $C_2$-$C_6$ alkyl; $R^2$ is methyl; m is from 12 to 20; and n is 0.

4. The composition of claim 2 wherein the at least one first hydrophobic group has a calculated Log P in the range of from 2 to 12.

5. The composition of claim 3 wherein the at least one first hydrophobic group is a remnant of a compound selected from the group consisting of 2-(t-butylamino) ethanol; 2-(dibutylamino) ethanol; 2-(dioctylamino) ethanol; 2-(diheptylamino) ethanol; 2-(bis (2-ethylhexyl) amino) ethanol; 2-(dihexylamino) ethanol; 3-(dibutylamino) propanol; 2-(dibutylamino) ethylamine; 3-(dibutylamino) propylamine; N-benzyl-N-methylethanolamine; 1-(dibutylamine)-2-butanol; 4-amino-1-benzyl-piperidine; 1-(benzyl (2-hydroxyethyl) amino)-3-butoxypropan-2-ol; 1-(benzyl (2-hydroxyethyl) amino)-3-(2-ethylhexyl) oxypropan-2-ol; 1-[bis (phenylmethyl) amino]-3- [(2-butyl) oxyl]-2-propanol; 1-[bis (phenylmethyl) amino]-3-[(2-ethylhexyl) oxyl]-2-propanol; and a dibenzylaminopolyalkylene oxide of the type:

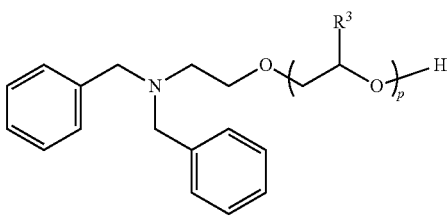

where $R^3$ is methyl or ethyl and p is from 1 to 10.

6. The composition of claim 1 wherein the first hydrophobically modified ethylene oxide urethane polymer is endcapped with two first hydrophobic groups; and the second hydrophobically modified ethylene oxide urethane polymer is endcapped with two second hydrophobic groups of structure I, wherein the composition further comprises a hydrophobically modified ethylene oxide urethane polymer endcapped with both first and second hydrophobic groups.

7. The composition of claim 6 wherein the mole: mole ratio of the hydrophobically modified ethylene oxide urethane polymer capped with a first hydrophobic group and a second hydrophobic group to the hydrophobically modified ethylene oxide urethane polymers capped with first hydrophobic groups only and second hydrophobic groups only is in the range of from 1:3 to 1:1, which composition is in the form of an aqueous solution; wherein the first hydrophobic group has a has a calculated log P in the range of from 4 to 10.

8. The composition of claim 7 wherein the mole: mole ratio of first hydrophobic groups to second hydrophobic groups is in the range of from 25:75 to 50:50.

9. The composition of any of claim 1 which further comprises pigment, binder, and at least one other component selected from the group consisting of surfactants, coalescents, defoamers, opaque polymers, and extenders.

10. A method of preparing a hydrophobically modified ethylene oxide urethane polymer blend comprising the step of contacting under reactive conditions, a) a water-soluble polyethylene glycol; b) a stoichiometric excess of a diisocyanate relative to the polyethylene glycol; a c1) a first hydrophobic compound functionalized with a secondary or a tertiary amine or a quaternary ammonium salt; and c2) a second hydrophobic compound of structure Ia, to form the hydrophobically modified ethylene oxide urethane polymer, wherein the hydrophobic compound of structure Ia is as follows:

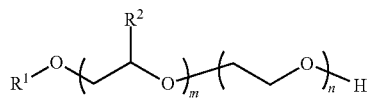

where $R^1$ is from $C_1$-$C_{10}$-alkyl; $R^2$ is from $C_1$-$C_6$-alkyl; m is from 5 to 40; and n is from 0 to 50, with the proviso that when m is from 5 to 9, n is from 0 to 10, and wherein the mole:mole ratio of first hydrophobic compound to second hydrophobic compound is in the range of from 15:85 to 75:25.

11. A composition comprising a hydrophobically modified alkylene oxide polymer co-endcapped with first and second hydrophobic groups, wherein the first hydrophobic group is functionalized with a secondary amine or a salt thereof, or a tertiary amine or a salt thereof; and the second hydrophobic group is represented by structure I:

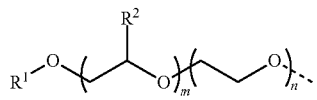

wherein the dotted line represents the point of attachment of the hydrophobic group of structure I to the alkylene oxide polymer backbone; where $R^1$ is from $C_1$-$C_{10}$-alkyl; $R^2$ is from $C_1$-$C_6$-alkyl; m is from 5 to 40; and n is from 0 to 50, with the proviso that when m is from 5 to 9, n is from 0 to 10, wherein the hydrophobically modified alkylene oxide polymer is a hydrophobically modified ethylene oxide urethane polymer, and wherein the mole:mole ratio of first hydrophobic groups to second hydrophobic groups is in the range of from 15:85 to 75:25.

12. The composition of claim 11 wherein $R^1$ is $C_1$-$C_8$ alkyl; $R^2$ is methyl or ethyl; m is from 10 to 30; and n is from 0 to 20.

13. The composition of claim 12 wherein $R^1$ is $C_2$-$C_6$ alkyl; $R^2$ is methyl; m is from 12 to 20; and n is 0.

14. The composition of claim 12 wherein the at least one first hydrophobic group has a calculated Log P in the range of from 2 to 12.

15. The composition of claim 13 wherein the at least one first hydrophobic group is a remnant of a compound selected from the group consisting of 2-(t-butylamino) ethanol; 2-(dibutylamino) ethanol; 2-(dioctylamino) ethanol; 2-(diheptylamino) ethanol; 2-(bis (2-ethylhexyl) amino) ethanol; 2 -(dihexylamino) ethanol; 3-(dibutylamino) propanol; 2-(dibutylamino) ethylamine; 3-(dibutylamino) propylamine; N-benzyl-N-methylethanolamine; 1-(dibutylamine)-2-butanol; 4-amino-1-benzyl -piperidine; 1-(benzyl (2-hydroxyethyl) amino)-3-butoxypropan-2-ol; 1-(benzyl (2-hydroxyethyl) amino)-3-(2-ethylhexyl) oxypropan-2-ol; 1-[bis (phenylmethyl) amino]-3-[(2-butyl) oxyl]-2-propanol; 1-[bis (phenylmethyl) amino]-3-[(2-ethylhexyl) oxyl]-2-propanol; and a dibenzylaminopolyalkylene oxide of the type:

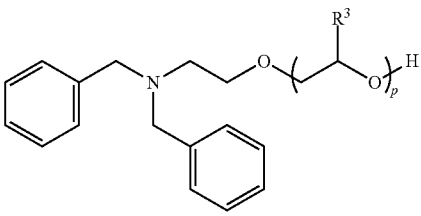

where $R^3$ is methyl or ethyl and p is from 1 to 10.

16. The composition of claim 13 which further comprises a second hydrophobically modified alkylene oxide polymer endcapped with two first hydrophobic groups and a third hydrophobically modified alkylene oxide polymer endcapped with two second hydrophobic groups, where the second and third hydrophobically modified alkylene oxide polymers are hydrophobically modified ethylene oxide urethane polymers; and where the total mole:mole ratio of first hydrophobic groups to second hydrophobic groups is in the range of from 15:85 to 50:50.

17. The composition of claim 16 wherein the first hydrophobic groups are a remnant of a compound selected from the group consisting of 2-(t-butylamino) ethanol; 2-(dibutylamino) ethanol; 2-(dioctylamino) ethanol; 2-(diheptylamino) ethanol; 2-(bis (2-ethylhexyl) amino) ethanol; 2-(dihexylamino) ethanol; 3-(dibutylamino) propanol; 2-(dibutylamino) ethylamine; 3-(dibutylamino) propylamine; N-benzyl-N -methylethanolamine; 1-(dibutylamine)-2-butanol; 4-amino-1-benzyl-piperidine; 1-(benzyl (2-hydroxyethyl) amino)-3-butoxypropan-2-ol; 1-(benzyl (2-hydroxyethyl) amino)-3-(2-ethylhexyl) oxypropan-2-ol; 1-[bis (phenylmethyl) amino]-3-[(2-butyl) oxyl]-2-propanol; 1-[bis (phenylmethyl) amino]- 3-[(2-ethylhexyl) oxyl]-2-propanol; and a dibenzylaminopolyalkylene oxide of the type:

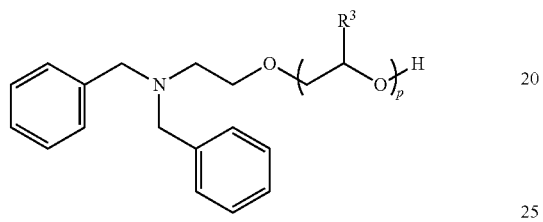

where $R^3$ is methyl or ethyl and p is from 1 to 10.

* * * * *